June 2, 1970   B. E. STEVENSON ET AL   3,515,438
MOTOR VEHICLE BRAKING APPARATUS
Original Filed Nov. 14, 1966   4 Sheets-Sheet 2
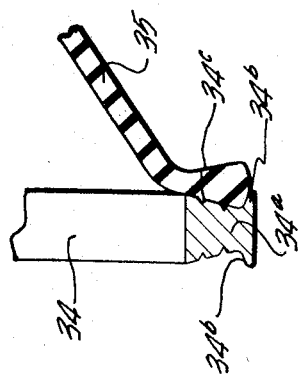
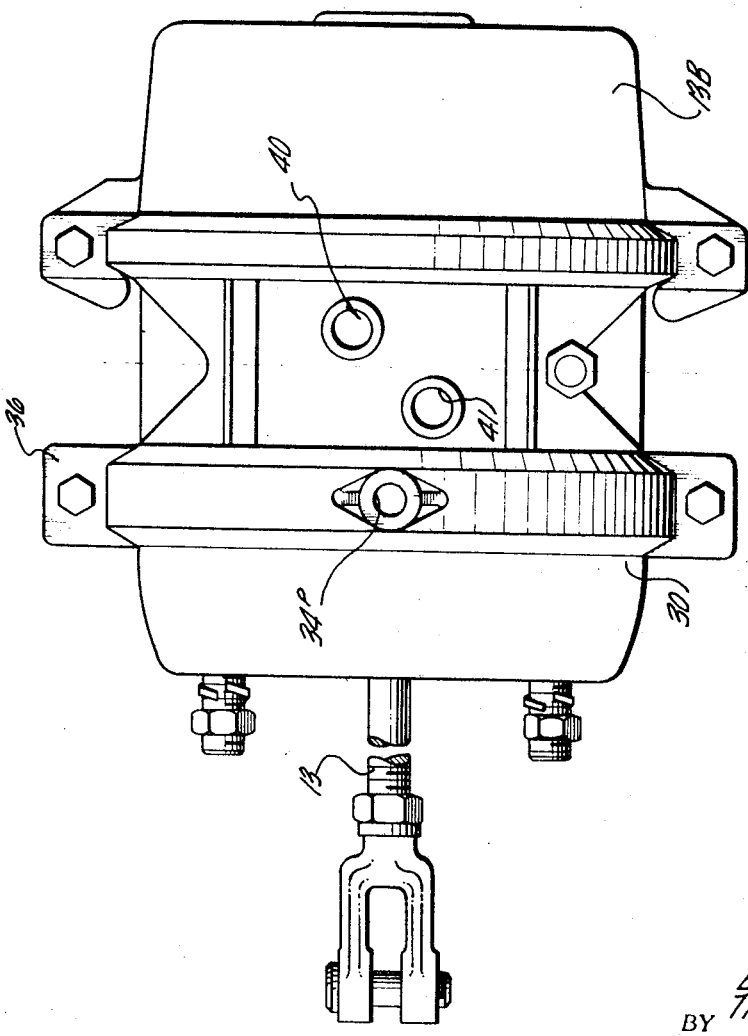
INVENTORS.
BILLY E. STEVENSON
THOMAS R. RUMSEY
BY
Christie, Parker & Hale
ATTORNEYS

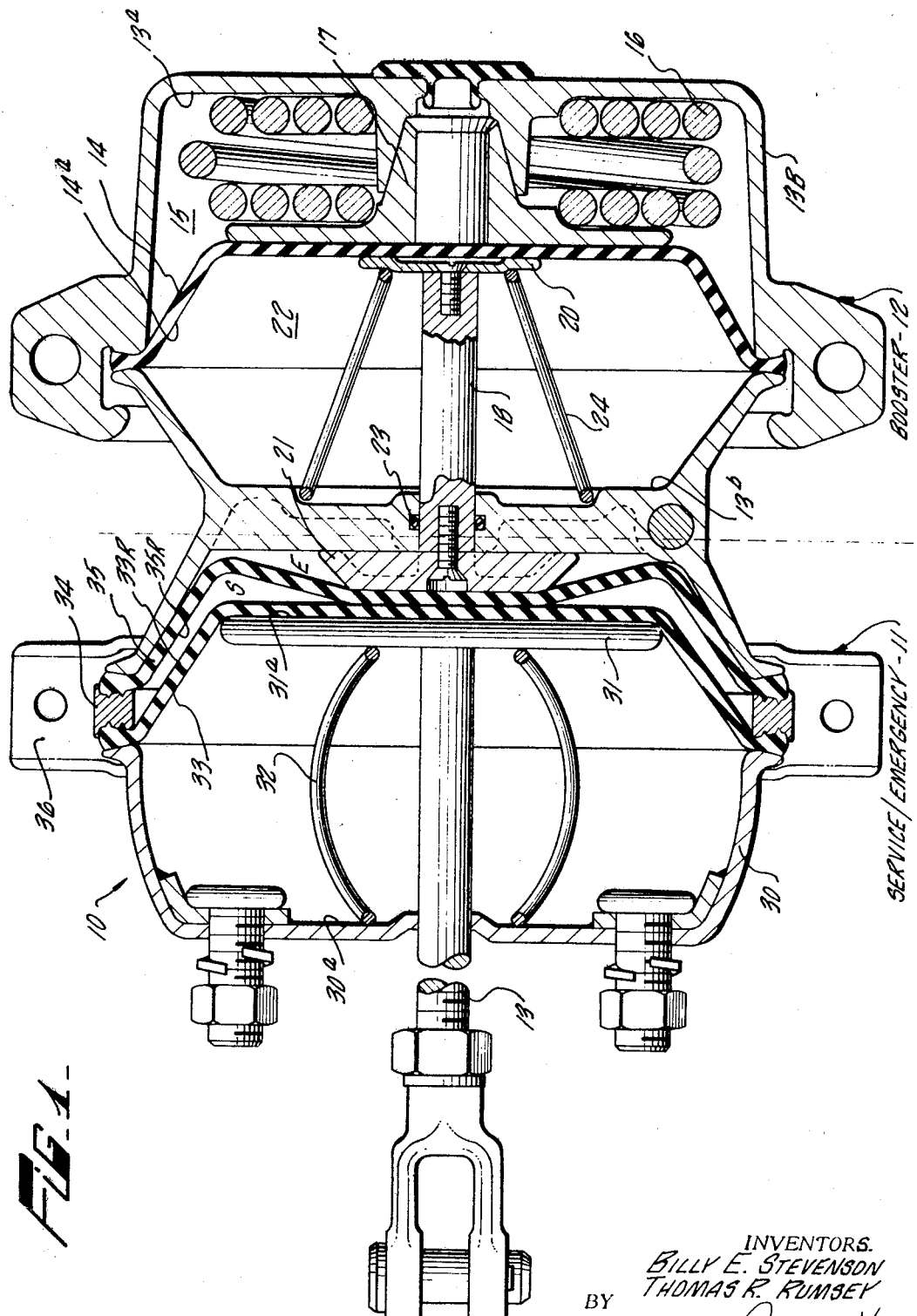

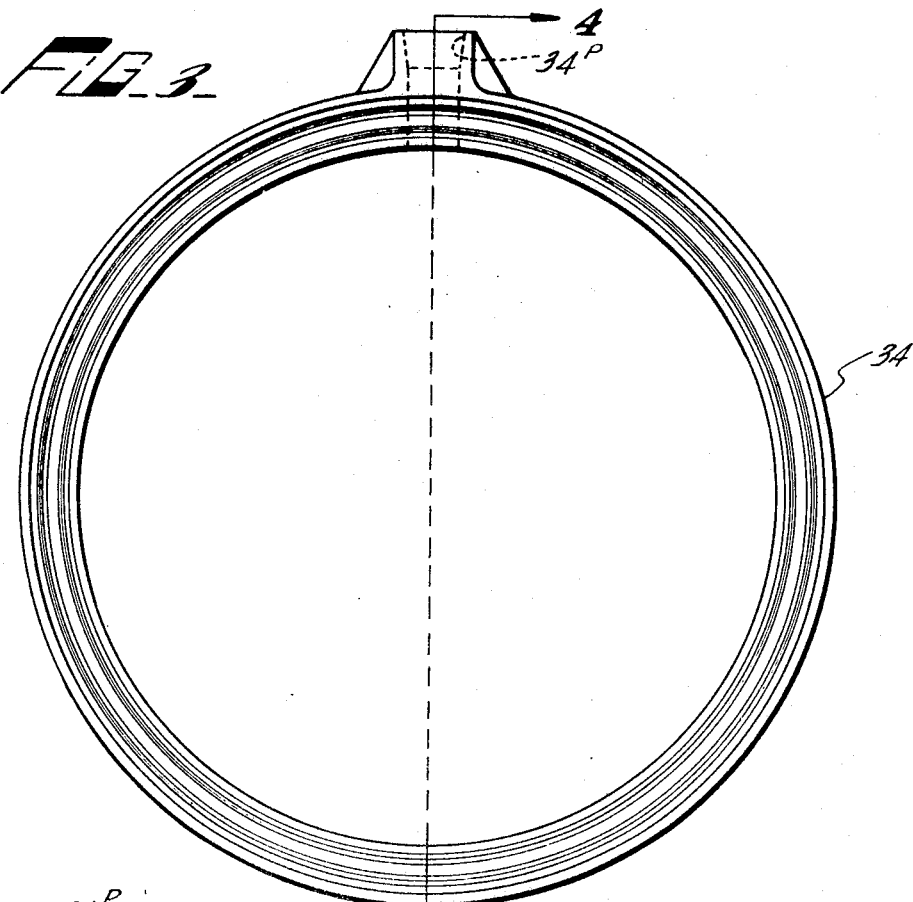
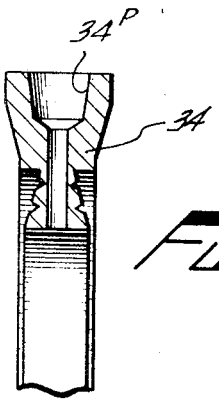
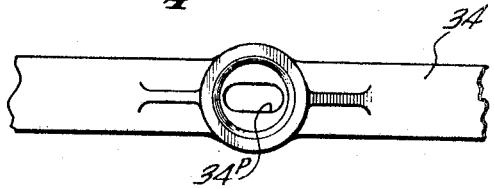
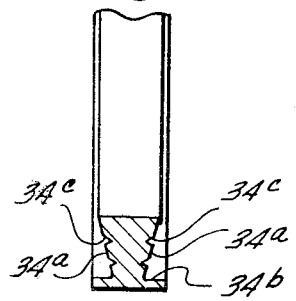
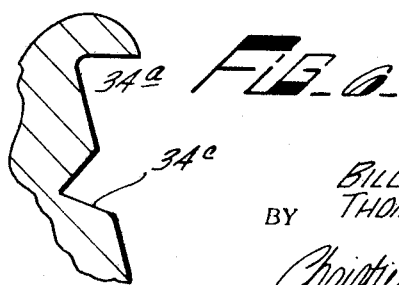
INVENTORS.
BILLY E. STEVENSON
THOMAS R. RUMSEY
BY
ATTORNEYS

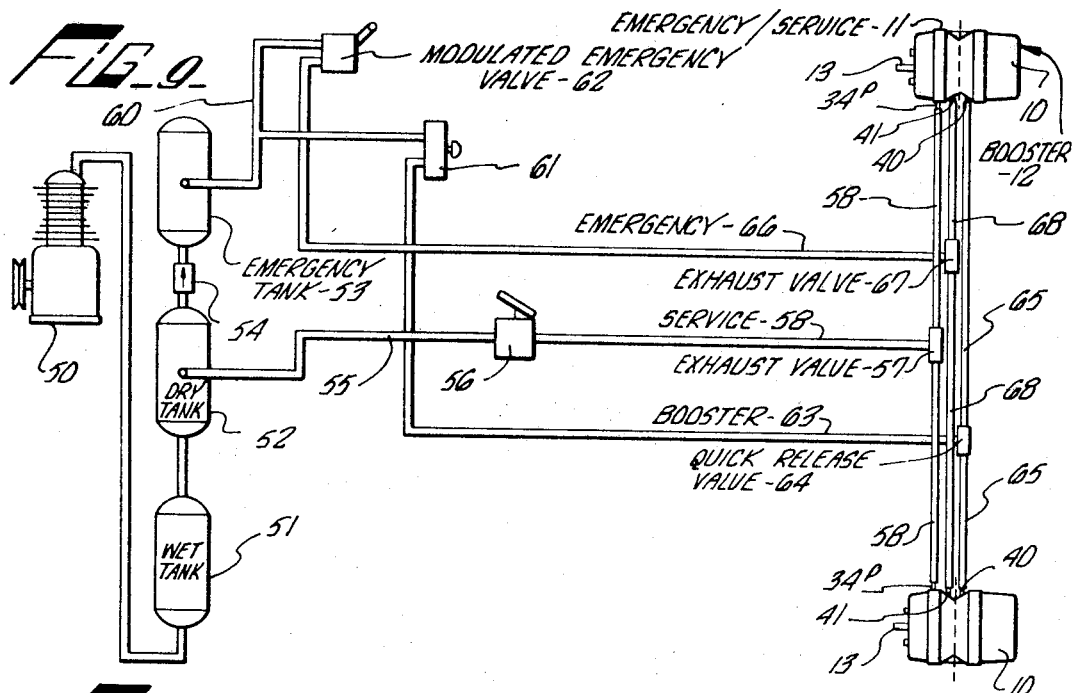
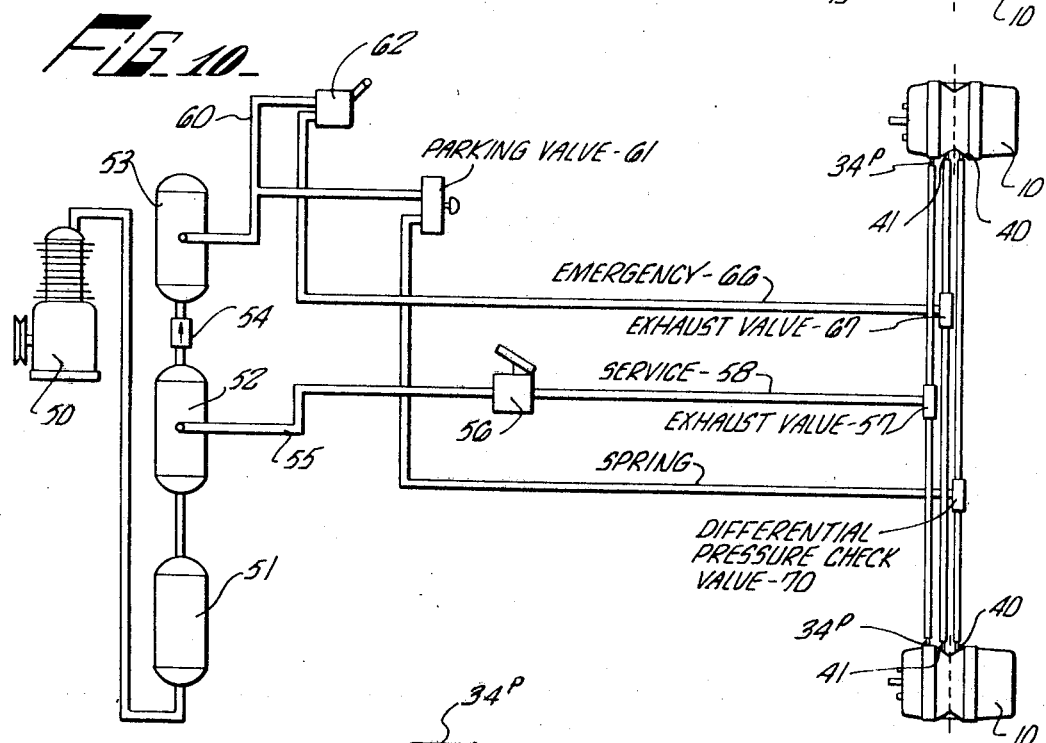

United States Patent Office 3,515,438
Patented June 2, 1970

3,515,438
MOTOR VEHICLE BRAKING APPARATUS
Billy E. Stevenson, Huntington Beach, and Thomas R. Rumsey, Inglewood, Calif., assignors, by mesne assignments, to Royal Industries, Inc., Pasadena, Calif., a corporation of Delaware
Original application Nov. 14, 1966, Ser. No. 593,818. Divided and this application Sept. 18, 1968, Ser. No. 760,574
Int. Cl. B60t 13/38
U.S. Cl. 303—9          2 Claims

ABSTRACT OF THE DISCLOSURE

A vehicle braking system for operating a combined service/emergency and booster unit. The system includes an emergency valve for controlling the amount of fluid pressure applied to the emergency brake for operation independent of the service brake and independent of the booster brake. The booster brake may be controlled by a conventional control system through a quick release valve or through the combination of a differential pressure check valve and parking valve arrangement for additional protection.

---

This application is a divisional application based on copending application bearing Ser. No. 593,818 filed on Nov. 14, 1966 and assigned to the same assignee as the present application; and now Pat. No. 3,417,671 granted on Dec. 24, 1968.

This invention relates to motor vehicle braking apparatus and more particularly to an improved service brake and combination service/emergency brake assembly for use with trucks or tractors and tractor-trailer combinations and the like, allowing the vehicle operator to continuously control the amount of braking of the vehicle.

There are presently available power actuated braking systems characterized as "fail safe" braking systems utilizing pressurized fluid or air to control the vehicle service brakes for both emergency operation and for parking purposes. These power actuated booster brakes are employed to complement the usual service braking units on motor vehicles such as trucks or tractors or tractor-trailer combinations. These booster units are mounted in a "piggyback" fashion with the associated service brakes and are employed for emergency and parking purposes. These auxiliary booster brakes are fluid operated devices that are normally maintained in a de-actuated condition in response to fluid under pressure and are constructed and designed to be responsive to the complete loss of the fluid under pressure or the loss of pressure below a preselected pressure for actuating the braking unit; "failing safe." It should also be appreciated that both the present day standard service brakes and booster brakes are constructed and defined to be either in a fully actuated condition or a fully deactuated condition. The standard service brake is operated by the application thereto of a fluid under pressure while the booster brake is automatically responsive for emergency operation due to the failure of the fluid under pressure. Alternatively, when the booster brake is employed for parking purposes, the operator normally exhausts the fluid under pressure from the booster brake to actuate the booster brake and thereby the braking unit. A typical service brake and service booster brake combination is disclosed in the co-pending application bearing Ser. No. 467,189 filed on June 18, 1965 entitled Fluid Operated Braking System, now Pat. No. 3,285,672 and assigned to the same assignee as the present application.

Experience with the braking apparatus of the type under consideration has proven that a booster brake constructed and defined in terms of a spring brake is a superior arrangement to all other methods and braking apparatus for positively parking a vehicle. All presently known spring booster brakes rely wholly upon the force exerted by a compressed compression spring to effect the braking action under the control of the operator for parking purposes or to automatically effect an emergency stop. The spring booster brake has been found to securely brake a motor vehicle such as a truck or truck trailer combination in a stationary stop. The very use of a compression spring in a booster brake requires certain characteristics when it is desired to employ it for braking and emergency stopping purposes that render it ineffective for allowing the operator to completely control the braking action.

At the present time there is a need for an auxiliary braking device to allow the motor vehicle operator to control the braking action in the same fashion the conventional braking system for a motor vehicle is controlled by the operator under emergency conditions. These emergency conditions should be distinguished from the emergency conditions rendering the spring booster brake operative mentioned hereinabove wherein the brake is fully actuated. The type of emergency braking that is desired is related to the condition of the road whereby the operator requires certain control over the speed of his vehicle to avoid an object on the road, or obstruction in the road or the like, requiring braking in increments depending on operator judgment. Present day compression springs employed in booster brakes are constructed and defined to be either in a fully compressed condition whereby the brake unit is deactuated or in a fully released position for actuating the brake unit. Such conventional springs therefore are also designed to be compressed with a maximum air pressure of 90 pounds per square inch. In addition, due to the limited amount of space for mounting the service brake and the booster brake, the spring for the booster brake must be of such size as to have a minimum length to facilitate its installation on the vehicle. To control the compression spring of a booster brake for the desired emergency application mentioned hereinabove by controlling the amount of fluid pressure applied to the booster brake has been found not to be practical due to the design requirements of the spring for booster service. To employ the booster brake for emergency application wherein the amount of fluid under pressure is modulated would require too long a time to exhaust the fluid pressure of the booster brake chamber to release the compression spring. This slow release of the compression spring will create a drag on the conventional brake resulting in excessive wear of the brake blocks and brake drums.

The present invention provides an improved service/emergency brake assembly that may be employed with the conventional braking unit which allows for modulated control of the service brake assembly for emergency purposes and yet affords the conventional service brake operation. In addition, the conventional service/emergency brake is of a construction that allows it to be used with present day commercially available booster brakes and to be arranged and operated therewith in the usual "piggyback" fashion. The improved braking apparatus of the present invention may be considered a "double safe" unit to maintain the effective positive parking feature of the spring booster brakes and also furnish a safe modulated emergency application of the vehicle brakes with an effectiveness closely approximating the application of the normal service brakes. The construction and design of the improved service emergency brake of the present invention meets the general requirements with regard to space for mounting this type brake unit since it is approximately one-half inch longer than present brakes of this type that do not incorporate the emergency braking feature.

The emergency braking feature embodied in the present braking apparatus results through the use of a standard diaphragm and therefore eliminates the need for any special diaphragms having built-in centers as employed in certain other prior art types of service/emergency braking units. The relatively simple construction of the service/emergency braking unit renders it relatively inexpensively with respect to similar competitive units. The internal construction of the brake unit allows the use of the standard diaphragms whereby the braking unit may be readily assembled by means of a single clamp further allowing for the ease of assembly and disassembly of the brake.

From a structional standpoint the conventional service and emergency braking assembly comprises a housing adapted to be secured adjacent the braking unit and enclosing the simiularly constructed and defined flexible diaphragms supported across the housing. The diaphragms are supported and spaced by means of a spacer ring having preselected dimensions with respect to the effectiveness of the braking action afforded by both of the diaphragms. In this fashion, a pair of fluid chambers are defined whereby one chamber is defined between the faces of the diaphragms while the second chamber is defined between the end of the housing and the adjacent diaphragm. The internal diaphragm can be considered the conventional service diaphragm as in the prior art braking apparatus, while the remaining diaphragm may function as an emergency diaphragm. The diaphragms in their normal operating relationship are held adjacent an end of the housing by means of a brake actuating rod resiliently held against the service diaphragm thereby placing the center portions of the two diaphragms in a side-by-side relationship. The opposite end of the brake actuating rod extends axially through the opposite end of the housing for operating the brake unit.

The spacer ring for supporting and mounting the pair of diaphragms includes means for admitting fluid under pressure between the diaphragms for actuating the brake actuating rod for the usual service brake operation. In addition, the housing is defined for admitting pressurized fluid between a surface of the emergency diaphragm and the adjacent end of the housing for controllably actuating the emergency diaphragm and thereby the brake actuating rod in increments under the control of the vehicle operator for controllably operating the braking unit.

From the standpoint of the vehicle braking system, the fluid control system for operating the service/emergency unit along with the booster unit includes means for modulating the flow of fluid under pressure for application to the emergency diaphragm of the combination service/emergency braking unit. For this purpose the fluid control system includes an emergency tank connected with the conventional tank means and compression unit presently employed on such motor vehicles whereby the emergency tank is isolated for emergency use only. The fluid control system includes a modulated emergency valve readily accessible to the vehicle operator for controlling the amount of the fluid pressure applied to the emergency brake for operation independent of the service brake and independent of the operation of the spring booster brake. The booster brake employed may be controlled by means of a conventional control system through the usual quick release valve or through the combination of the differential pressure check valve and parking valve arrangement for additional protection.

These and other features of the present invention will be more fully appreciated when considered in the light of the following specification drawings, in which:

FIG. 1 is a cross-sectional view, with portions shown in elevation, of a combination service/emergency brakes and booster brake assembly arrange in a "piggyback" fashion and embodying the invention;

FIG. 2 is an elevational view of the brake unit of Fig. 1;

FIG. 3 is a detached, front elevational view of the spacer ring for the service/emergency brake unit of FIG. 1;

FIG. 4 is a sectional view taken along the line 4—4 in FIG. 3;

FIG. 5 is a partial top plan view of the ring as illustrated in FIG. 3;

FIG. 6 is an enlarged, detailed view of the grooves in the diaphragm sealing portion of the ring in FIG. 3;

FIG. 7 is a partial, detached view of the relationship of a diaphragm for service/emergency unit of FIG. 1 and the sealing portion of the mounting ring, FIG. 8 is a partial, cross-sectional view of the sealing ring and diaphragms for the service/emergency unit of FIG. 1 showing their assembled relationship;

FIG. 9 is a schematic view of the fluid control system for a combination service/emergency unit and a booster unit embodying the invention; and FIG. 10 is a modified fluid control system for use with the invention.

Now referring to the drawings and to FIG. 1 in particular, the combination service/emergency unit embodying the invention will be described. FIG. 1 illustrates in cross section a brake apparatus 10 that comprises a service/emergency braking unit 11 connected with a booster unit 12 in the conventional "piggyback" fashion. It will be appreciated by those skilled in the art that the brake apparatus 10 illustrated in FIG. 1 is typical of the brake apparatus applied to a pair of wheels of a truck or tractor, or tractor hauled trailer and that at least a pair of the wheels will carry the braking apparatus 10. For this purpose, the braking apparatus 10 is provided with a braking rod 13 for connection to the conventional braking unit (not shown). It should be understood that the operation of the braking rod 13 effects the corresponding operation of the braking unit as is conventional in the prior art braking apparatus. The booster unit 12 of the braking apparatus 10 is illustrated in FIG. 1 under the condition where the fluid under pressure is fully applied to the booster unit 12 as it is arranged in normal operation for parking purposes and emergency operation.

The construction of the booster unit 12 is of conventional construction and such booster units are commercially available from the Overland Anchorlok Division of Royal Industries, Inc. of Culver City, Calif. Briefly the booster unit 12 comprises a housing 13B including a booster diaphragm 14 mounted across the housing to define a pair of chambers on opposite sides thereof. A chamber 15 defined on the right side of the booster diaphragm 14, as illustrated in FIG. 1, defines a chamber for caging a conventional booster compression spring 16 therein. The compression spring 16 is mounted against a floating bearing plate 17 mounted adjacent the right hand side of the diaphragm 14 and the outer end of the housing 13B. In the illustrated caged or fully compressed condition of the spring 16, the spring is maintained between the bearing plate 17 and the adjacent wall 13$^a$ of the housing 13B. It will also be noted that the compression spring 16 positions and holds the floating bearing plate 17 against the face of the booster diaphragm 14. The opposite sides of the booster diaphragm 14 mounts a push rod 18 having a push plates 20 and 21 mounted to opposite ends thereof. The push rod 18 is maintained within the chamber 22 which may be considered as the fluid or air chamber for the booster unit 12. The chamber 22 is defined by means of the fluid exposed surface of the diaphragm 14 further identified by the reference character 14$^a$, the opposite face of the chamber being defined by the housing 13B proper and more particularly the wall identified by the reference numeral 13$^b$. The push rod 18 is slidably mounted through the wall 13$^b$ of the housing in a fluid tight fashion to maintain the chamber 22 properly pressurized. For this purpose an O ring 23 is mounted within the wall 13$^b$. A spring 24 is mounted within the air chamber 22 between the push rod plate 20 and the wall 13ᵇ of the housing 13B to maintain a minimum amount of pressure on the booster diaphragm 14 and thereby the compression spring 16.

It should be recognized that with the fluid chamber 22 fully pressurized that the push rod 18 will be arranged as illustrated in FIG. 1. Upon the complete failure of the fluid pressure to the fluid chamber 22 or when the pressure within the chamber falls below a predetermined pressure the compression spring 16 will be allowed to expand against the booster diaphragm 14 for moving the diaphragm to the left thereby operating the push rod 18. The push rod 18, in turn, will be effective for operating the brake operating rod 13 through the service/emergency unit 11 in the usual fashion and thereby the braking unit. The above-described booster unit 12 is of conventional construction and the booster unit, per se, does not form a portion of the present invention.

The booster unit 12 is arranged in the conventional "piggyback" fashion with the service/emergency unit 11 whereby the push rod plate 21 for the push rod 18 is mounted within the service/emergency unit 11 proper to allow for the "piggyback" or tandem operation of the service/emergency unit 11 and the booster unit 12.

Now referring to the service/emergency braking unit 11 in particular, it will be seen that it is of the same general configuration and construction as present day service units that are not provided with the controlled emergency feature. In the disclosed embodiment the service/emergency unit 11 comprises a housing 30 having the usual brake actuating rod 13 axially mounted therein and extending between the service diaphragm 33 and the left end of the housing 30, as illustrated in FIG. 1. The brake actuating rod 13 axially extends through the interior of the housing 30 and has an enlarged push rod plate 31 secured to its interior end. The push rod plate 31 is resiliently mounted with the face 31ª adjacent the inner end of the service diaphragm 33 by means of a spring 32. The spring 32 is seated between the opposite face of the push rod plate 31 and the inner wall 30ª of the housing 30. The diaphragm 33 has been specified as the service diaphragm of the service/emergency braking unit 11. A spacing and mounting ring 34 mounts the service diaphragm 33 on one side thereof, and an emergency diaphragm 35 on the opposite side thereof. The emergency diaphragm 35 is mounted to the ring 34 in the same fashion as the service diaphragm 33 to extend across the housing 30 to thereby define a pair of fluid chambers on opposite sides of the emregency diaphragm 35, as will be described more fully hereinafter.

An important feature of the present invention is the fact that the service/emergency unit 11 is constructed and defined whereby standard commercially available diaphragms may be employed for both the service and emergency features of the unit 11. These diaphragms are considered conventional in the sense that their construction is similar to present day service diaphragms employed in the type of braking units under consideration and, in fact, are similar in construction to the booster diaphragm 14 described hereinabove.

The fluid chamber defined between the diaphragms 33 and 35 identified by the reference letter S is the fluid chamber for operating the service diaphragm 33. The fluid chamber defined on the opposite side of the emergency diaphragm 35 is considered the emergency chamber E. The emergency diaphragm 35 is further illustrated with its midsection abutting the push rod plate 21 of the booster unit 12. The unit 11 is further arranged so that the midsections of diaphragms 33 and 35 are placed in a side-by-side relationship or abutting one another, as illustrated in FIG. 1. It will also be appreciated that the service/emergency unit 11 is actuated through the independent application of fluid under pressure to the service fluid chamber S and the emergency fluid chamber E for moving the brake activating rod 13. The ring 34 mounting the diaphragms 33 and 35 is secured to the housing 30 by means of a single clamping element 36.

Another important feature of the present invention is the construction of the spacing and mounting ring 34 for spacing and mounting the service diaphragm 33 and the emergency diaphragm 35 in the correct relaitonship to provide effective braking action. The width of the ring 34 is defined to allow standard diaphragms to be employed for both service and emergency purposes. This should be contrasted with prior art service/emergency braking devices wherein at least a single diaphragm must be specifically constructed with a built-up center section for rendering it effective to produce the desired brake actuation.

The ring 34, as illustrated in FIGS. 3–5, is provided with a fluid entry port 34ᵖ extending therethrough. The fluid entry port 34ᵖ is defined to accept a conventional coupling device for conveying fluid, such as air under pressure, to the port 34ᵖ and thereby to the service fluid chamber S, as illustrated in FIG. 2. The coupling device extends through a suitable aperture in the clamp 36 to which a fluid conduit is connected to the fluid control system to be described immediately hereinatfer. One of the limiting factors with respect to the width of the mounting ring 36 is the size of the fluid port 34ᵖ required for proper operation. This is considered in accordance with the present invention and the minimum width of the ring 36 is on the order of 0.365 inch. It will also be appreciated that the effectiveness of the emergency diaphragm 35 depends upon its spacing from the service diaphragm 33 and its effectiveness decreases with the increase in the spacing. To allow conventional diaphragms to be employed and to maintain the desired effectiveness for the emergency diaphragm 35, it has been found that the maximum spacing between the two diaphragms 33 and 35 should be on the order of 0.500 inches. Specifically, then the width of the ring 34 may fall within 0.365 inches and 0.500 inches and it has been further determined that a ring width of 0.465 inches is preferable.

In addition to the definition of the width of the ring 34 within the above-described limits, the ring per se has important features with regard to the sealing action it affords with respect to the diaphragms 33 and 35. The ring 34, as best viewed in FIGS. 4, 6 and 7, is provided with a sealing feature defined by the undercut portions 34ª adjacent the outer periphery of the ring 34. The ring 34 is undercut at the portions 34ª on the opposite faces of the ring for defining sealing flanges 34ᵇ on the same faces. In addition to the flanges 34ᵇ the undercut portion 34ª is grooved by means of grooves 34ᶜ, as best illustrated in the enlarged sectional view of FIG. 6.

Thruogh the provision of the sealing flange 34ᵇ, an outer sealing area is created for sealing the diaphragms 33 and 35 within the housing 30 of the service/emergency unit 11. In addition, the definition of the flanges 34ᵇ on the rings 34 avoids the usual bolging of the diaphragms at the point of mounting as in conventional constructions and provide an improved seal leading to the elimination of "leakers." The construction of the rings in this fashion also allows both the service and emergency diaphragms 33 and 35 to be mounted and assembled together and thereby locked by a single clamping element 36 to the housing proper with a minimum effort and expense.

It should also be noted that the continued operation of the diaphragms 33 and 35 causes the adjacent faces identified as 33R and 35R of the diaphragms 33 and 35 to continuously move or rub against one another and therefore present a wear area. It has been found that the use of conventional diaphragms are satisfactory for up to 25,000 cycles, and that the life of these diaphragms can be improved by the application of a non-friction agent to the designated surfaces of the diaphragms 33 and 35 leading to the reduction of wear between the diaphragms. This non-friction agent can be applied over the entire wear surfaces 33R and 35R of diaphragms 33 and 35. Although it may be convenient to apply the non-friction agent over the entire surfaces 33R and 35R, the agent need only be applied to these surfaces at preselected areas on opposite sides of the midsections of the diaphragms.

Now referring to FIG. 9, a fluid control system allowing dependable operation of the service/emergency units 11 and the booster unit 12 will be described. It should be appreciated that the housings for the braking apparatus 10 includes the housing 13B for the booster unit 12 and the housing 30 for the service/emergency units 11 mounted in the "piggyback" fashion. The pressurized fluid, which may be air under pressure, is admitted into the fluid chamber 22 for the booster unit 12 by means of the fluid port 40 provided in the housing 13B. In the same fashion, the fluid under pressure to be applied to the fluid chamber E is applied by means of the fluid port 41 defined in the housing 30. The fluid is admitted into the chamber S as previously described by means of the fluid port 34p. The fluid control system illustrated in FIG. 9 is arranged for a pair of braking units 10 associated with a pair of wheels to be braked and illustrated with the brake units 10 comprising the service/emergency units 11 and the booster units 12. For this purpose the fluid under pressure includes a fluid pressure source comprising the vehicle compressor 50 arranged in a serial fashion with first and second tank means. The first tank means may be considered as comprising the wet tank 51 and the dry tank 52 connected by a suitable conduit between the compressor 50 in serial fashion. The fluid pressure source further includes an emergency tank 53 mounted to be supplied from the dry tank 52 and suitably connected thereto. The emergency tank 53 is connected to the dry tank 52 by a conduit including a one-way check valve 54 which prevents the loss of the fluid under pressure or the fluid flow from the emergency tank 53 to the dry tank 52 when the fluid in the dry tank 52 is exhausted. To operate the braking units 10 as service brakes, they are connected to the dry tank 52 of the first tank means by means of a fluid conduit 55 connected between the tank 52 and a treadle valve 56. The output end of the treadle valve 56 is connected to the exhaust valve 57 by means of suitable service conduits 58. In the same fashion the exhaust ports of the exhaust valve 57 are connected by suitable conduits 58 to the service ports 34p of the service/emergency units 11.

The booster unit 12 as well as the emergency portions of the service/emergency units 11 are operated from the emergency tank 53. For this purpose the fluid conduit 60 is connected to the emergency tank 53 in parallel with a booster brake control 61 and a commercially available modulated emergency valve 62. The booster brake control 61 has its output port connected by means of a booster conduit 63 to a quick release valve 64. The quick release valve 64 is coupled by means of a pair of output ports in parallel relationship to the booster ports 40 for the booster units 12 by means of the fluid conducts 65. The output port of the emergency valve 62, in turn, is connected by means of the emergency conduit 66 to the exhaust valve 67. The exhaust ports of the exhaust valve 67 are connected to the emergency conduit 68 to the emergency ports 41 of the service/emergency units 11.

With the above construction in mind, it should now be appreciated that the operation of the service portion of the service/emergency units 11 is conventional. The service units, and in particular the service diaphragm 33, may be actuated by the vehicle operator through the manual operation of the treadle valve 56 to thereby admit the fully pressurized fluid to the fluid chambers S for actuating the diaphragms 33 thereby causing the movement of the rods 13 and thereby the immediate and full application of the service brakes. In the same general fashion, the booster brakes 12 are operated by the operation of the booster brake control 61. In this instance, however, the pressurized fluid is exhausted from the chambers 22 of the booster units 12 to release the compression springs 16 and thereby actuating the brakes fully.

In addition to these control devices, the operator can control the pressurization of the fluid applied to the chamber E of the emergency service units 11 through the operation of the emergency valve 62. It should be appreciated that the operation of the emergency valve 62 controls the pressurization of the chamber E and thereby the increment of movement of the brake operating rod 13 in response to the movement of the emergency diaphragm 35 in accordance with the judgment of the operator as to the required amount of braking. The pressurization is effected by the movement of the valve 62 by the motor vehicle operator to increase or decrease the pressurization of the fluid chamber E.

Now referring to FIG. 10, another fluid control system is described including a further safety feature and embodying the present invention. The fluid control system illustrated in FIG. 10 is the same general type disclosed in FIG. 9 except that the booster unit 12 is arranged in a fluid control system with a differential pressure check valve 70 arranged downstream from the control valve or parking valve 61 to afford further protection to the vehicle operator. A particular fluid control system and components thereof is more fully described in the aforementioned copending application bearing Ser. No. 467,189; now Pat. No. 3,285,672. It should be appreciated that with the aforementioned modification of the fluid control system, the system of FIG. 10 operates in the same general fashion as the system of FIG. 9.

It should now be appreciated that the present invention has advanced the state of the art through the provision of an improved braking device capable of use as a power actuated service brake and as an operator controlled, power activated emergency brake wherein the brake may be actuatued in controlled increments in accordance with the judgment of the vehicle operator.

We claim:

1. In a vehicle braking system of the type employing separate braking assemblies for each of a plurality of wheels, each adapted to be activated to braking position by a fluid operated brake actuator comprising a source of fluid under pressure comprising a compressor serially connected to a pair of tank means for supplying fluid under pressure to a vehicle braking system and including a one-way check valve connected between said tanks to maintain the fluid under pressure in the downstream tank when the upstream tank is exhausted thereby maintaining the tank as an emergency tank, a fluid operated brake actuator for each of said plurality of wheels characterized in that each brake actuator is alternately operative as a service brake and as an emergency brake and having individual fluid ports for operating the brake actuator as a service brake or an emergency brake, a first exhaust valve means connected to the emergency fluid port of the brake actuator, a control valve means connected between said emergency tank and said exhaust valve for controlling the pressurization of the brake actuator functioning as an emergency brake in controllable increments, a second exhaust valve means connected to the service brake port of the brake actuator, control valve means connected between said second exhaust valve means and said upstream tank for placing the brake actuator in either a fully actuated position or fully deactuated position, mechanically powered alternate brake setting means effective to set the vehicle brakes upon failure of pressurized fluid, said mechanically powered brake setting means including means for holding said brake setting means deactivated normally by use of pressurized fluid, manually controlled valve means sonnected to said emergency tank to receive fluid under pressure readily accessible to the vehicle driver from his normal driving position to vent pressurized fluid from said mechanically powered brake setting means thereby activating the latter to set and hold the mechanically powered brakes positively set until pressurized fluid is again admitted to said mechanically powered brake setting means, and pressure differential responsive check valve means in the pressurized fluid supply to said means for holding the brake setting means deactivated, said pressure differential responsive check valve being positioned downstream from said manually controlled valve whereby the opening of said check valve to vent fluid to the atmosphere causes an abrupt pressure drop on the downstream side of said manual valve, said check valve means including means operable to pass pressurized fluid to said holding means and to hold such fluid captive against reverse flow until the system pressure falls below a predetermined minimum operating pressure whereupon said captive fluid is automatically vented to the atmosphere thereby allowing said mechanically powered brake setting means to set the vehicle brakes, and pressure responsive means operatively connected with said manual valve operable by said abrupt pressure drop to close said manual valve to prevent fluid loss from the braking system as a whole.

2. In a vehicle braking system as defined in claim 1 wherein said brake actuator comprises a housing having first and second flexible diaphragms supported therein and including means for admitting pressurized fluid between the diaphragms for operating the actuator and means for admitting pressurized fluid between one of the diaphragms and the adjacent end of the housing for operating the actuator, said first mentioned control valve means being connected to said first mentioned admitting means, and said second mentioned control valve being connected to said second mentioned admitting means.

References Cited

UNITED STATES PATENTS

| | | | |
|---|---|---|---|
| 3,003,825 | 10/1961 | Kemble. | |
| 3,285,672 | 11/1966 | Avrea | 303—9 |
| 3,326,090 | 6/1967 | Cruse | 92—64 |
| 3,385,636 | 5/1968 | Cruse | 91—411 |

FERGUS S. MIDDLETON, Primary Examiner

J. J. McLAUGHLIN, Jr., Assistant Examiner

U.S. Cl. X.R.

303—2, 13; 91—170, 411; 92—62, 63, 64; 60—57